United States Patent
Rao

(10) Patent No.: US 10,614,596 B2
(45) Date of Patent: Apr. 7, 2020

(54) IMAGE PROCESSING METHOD, ELECTRONIC DEVICE AND APPARATUS HAVING STORAGE FUNCTION

(71) Applicant: SHENZHEN CHINA STAR OPTOELECTRONICS SEMICONDUCTOR DISPLAY TECHNOLOGY CO., LTD, Shenzhen, Guangdong (CN)

(72) Inventor: Yang Rao, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 205 days.

(21) Appl. No.: 15/736,928

(22) PCT Filed: Nov. 23, 2017

(86) PCT No.: PCT/CN2017/112621
§ 371 (c)(1),
(2) Date: Dec. 15, 2017

(87) PCT Pub. No.: WO2019/071737
PCT Pub. Date: Apr. 18, 2019

(65) Prior Publication Data
US 2019/0385343 A1      Dec. 19, 2019

(30) Foreign Application Priority Data

Oct. 10, 2017   (CN) .......................... 2017 1 0937445

(51) Int. Cl.
*G06T 11/00*      (2006.01)
*G06T 5/00*       (2006.01)

(52) U.S. Cl.
CPC ............ *G06T 11/001* (2013.01); *G06T 5/003* (2013.01); *G06T 2207/10024* (2013.01)

(58) Field of Classification Search
CPC .................. G06T 11/001; G06T 5/003; G06T 2207/10024
(Continued)

(56) References Cited

U.S. PATENT DOCUMENTS 6,437,792 B1 * 8/2002 Ito .......................... H04N 1/6058
                                                           345/590
2003/0179925 A1     9/2003 Hsu
(Continued)

FOREIGN PATENT DOCUMENTS

CN      1753452 A      3/2006
CN      101543039 A    9/2009
(Continued)

*Primary Examiner* — Hai Tao Sun
(74) *Attorney, Agent, or Firm* — Hemisphere Law, PLLC; Zhigang Ma

(57) ABSTRACT

The present disclosure discloses an image processing method, an electronic device and an apparatus having a storage function. The method includes: inputting a to-be-processed image of a source color gamut; converting a pixel value within the to-be-processed image into a coordinate value of a preset color space; determining whether a first color gamut point in the source color gamut is located outside a target color gamut according to the coordinate value; if yes, converting the first color gamut point into a second color gamut point in an outer converting region in the target color gamut. In the above manner, the present disclosure can increase the level of detail of an image after being mapped in different color gamuts.

10 Claims, 4 Drawing Sheets

(58) Field of Classification Search
USPC .......................................................... 345/604
See application file for complete search history.

(56) References Cited

U.S. PATENT DOCUMENTS

| | | |
|---|---|---|
| 2005/0219574 A1 | 10/2005 | Ok et al. |
| 2006/0188156 A1 | 8/2006 | Kwak et al. |
| 2008/0043260 A1* | 2/2008 | Ramanath ............. G06T 11/001 358/1.9 |
| 2009/0009528 A1 | 1/2009 | Olive |
| 2014/0092122 A1* | 4/2014 | Sano ........................ G09G 5/02 345/601 |
| 2018/0191925 A1* | 7/2018 | Stauder ................ H04N 1/6058 |

FOREIGN PATENT DOCUMENTS

| | | |
|---|---|---|
| CN | 102209179 A | 10/2011 |
| CN | 104809994 A | 7/2015 |
| CN | 104869378 A | 8/2015 |
| CN | 106991675 A | 7/2017 |
| EP | 0975149 A2 | 1/2000 |
| JP | 2011-135215 A | 7/2011 |

* cited by examiner

IMAGE PROCESSING METHOD, ELECTRONIC DEVICE AND APPARATUS HAVING STORAGE FUNCTION

RELATED APPLICATIONS

The present application is a National Phase of International Application Number PCT/CN2017/112621, filed Nov. 23, 2017, and claims the priority of China Application No. 201710937445.6, filed Oct. 10, 2017.

FIELD OF THE DISCLOSURE

The present disclosure relates to an image processing and a display technology field, and more particularly to an image processing method, an electronic device and an apparatus having a storage function.

BACKGROUND OF THE DISCLOSURE

Display as a friendly interface for human information exchange, can accurately, intuitively and clearly output information. When the display screen is sold as an electronic product, the image quality of the display screen becomes an important deciding factor for the consumers to purchase. The image quality is determined by the relevant parameters such as brightness, color cast, sharpness and the like. Therefore, evaluating display screen image quality is an important part of display screen development and design. As the display of information directly through the human eye observation, for different environments and uses, the evaluation criteria are different. In recent years, with the rapid increase in the number and diversity of various display technologies, people have become increasingly demanding on the display image quality.

In the prior art, the color gamut matching method is usually used to map the color gamut of the source color gamut to the target color gamut to reduce the difference between the color gamut of the source color gamut and the target color gamut so as to realize high fidelity reproduction of the color gamut. However, in the long-term research and development process, the inventor of the present application found that the color points outside the target color gamut in the prior art are easily mapped to the target color gamut boundary, resulting in a loss of detail levels of the image after the mapping, blurring the image and causing a halo noise phenomenon.

SUMMARY OF THE DISCLOSURE

The technical problem to be solved by the present disclosure is to provide an image processing method, an electronic device, and an apparatus having a storage function, which can enhance the level of detail of the mapped image color.

In order to solve the above technical problem, one technical solution adopted by the present disclosure is to provide an electronic device, the electronic device includes: a processor, a communication circuit and a memory, wherein the processor is coupled to the communication circuit and the memory; the communication circuit is used for inputting a to-be-processed image of a source color gamut; the processor is configured to convert a pixel value within the to-be-processed image into a coordinate value of a preset color space, and to determine whether a first color gamut point in the source color gamut is located outside a target color gamut according to the coordinate value, if yes, converting the first color gamut point into a second color gamut point in an outer converting region in the target color gamut; if not, converting the first color gamut point into a seventh color gamut point in the target color gamut according to a preset rule, and outputting the to-be-processed image of the target color gamut; wherein the preset color space is a Lab space, and the coordinate value is a L*a*b* value.

In order to solve the above technical problem, another technical solution adopted by the present disclosure is to provide an image processing method, the method includes: inputting a to-be-processed image of a source color gamut; converting a pixel value within the to-be-processed image into a coordinate value of a preset color space; determining whether a first color gamut point in the source color gamut is located outside a target color gamut according to the coordinate value; if yes, converting the first color gamut point into a second color gamut point in an outer converting region in the target color gamut.

In order to solve the above technical problem, another technical solution adopted by the present disclosure is to provide an apparatus having a storage function, wherein the apparatus having the storage function stores program data, and when the program data is executed by the processor, the following steps are implemented: inputting a to-be-processed image of a source color gamut; converting a pixel value within the to-be-processed image into a coordinate value of a preset color space; determining whether a first color gamut point in the source color gamut is located outside a target color gamut according to the coordinate value; if yes, converting the first color gamut point into a second color gamut point in an outer converting region in the target color gamut.

The beneficial effects of the present disclosure are: different from the prior art, the present disclosure provides an image processing method, the method includes: inputting a to-be-processed image of a source color gamut; converting a pixel value within the to-be-processed image into a coordinate value of a preset color space; determining whether a first color gamut point in the source color gamut is located outside a target color gamut according to the coordinate value; if yes, converting the first color gamut point into a second color gamut point in an outer converting region in the target color gamut. By the above method, the present disclosure can transform the first color gamut point in the source color gamut outside the target color gamut into the second color gamut point in the outer converting region in the target color gamut, which avoids overlapping of multiple color gamut points in the source color gamut to the same color gamut of the target color gamut to avoid overlapping mapping, increasing the level of detail of the mapped image and improving the color of the image to obtain a high-definition image.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF PREFERRED EMBODIMENTS

The technical solutions in the embodiments of the present disclosure are clearly and completely described below with reference to the accompanying drawings in the embodiments of the present disclosure. Obviously, the described embodiments are only a part but not all of the embodiments of the present disclosure. All other embodiments obtained by a person of ordinary skill in the art based on the embodiments of the present disclosure without creative efforts shall fall within the protection scope of the present disclosure.

Figure 1:
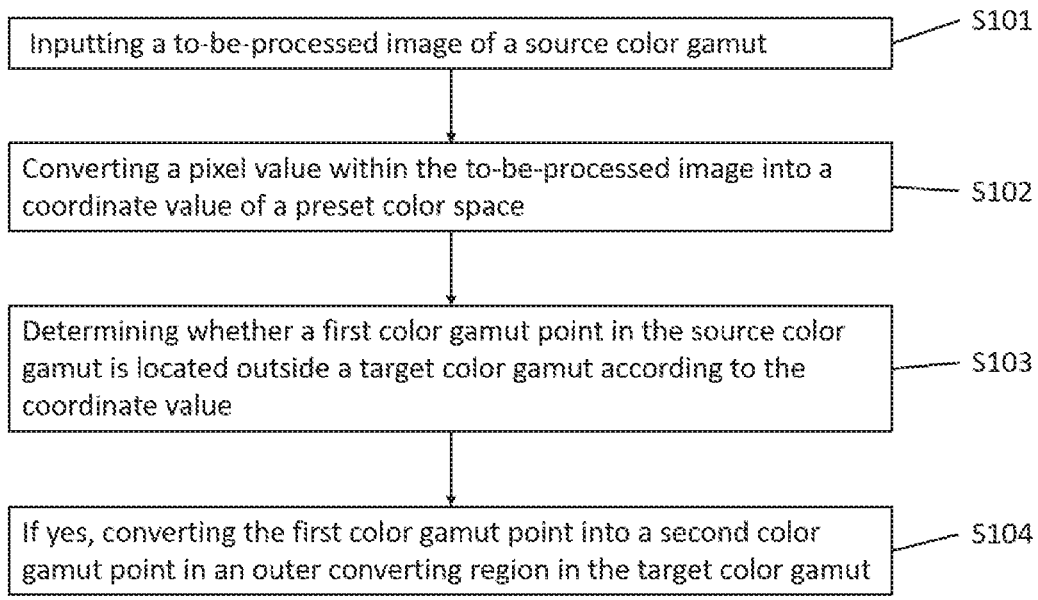
FIG. 1 is a schematic flow chart of an embodiment of an image processing method according to the present disclosure.

Referring to FIG. 1. FIG. 1 is a schematic flow chart of an embodiment of an image processing method according to the present disclosure. In the present embodiment, the method includes the steps of:

S101: inputting a to-be-processed image of a source color gamut.

In this embodiment, the source color gamut may be any color gamut. In particular, the source color gamut may be a sRGB color gamut. In other embodiments, the source color gamut may also be other gamuts, such as an Adobe RGB color gamut, and a desired custom color gamut may be set according to the users needs, which is not limited herein.

The to-be-processed image may be a color image containing one or more pixels.

S102: converting a pixel value within the to-be-processed image into a coordinate value of a preset color space.

The pixel value within the to-be-processed image may be a grayscale value of each color sub-pixel corresponding to the pixel point. Specifically, in the present embodiment, the pixel value may be the grayscale value of a red R sub-pixel, a green G sub-pixel, and a blue B sub-pixel corresponding to the pixel, and the pixel value may be collected by various existing methods, which are not limited herein.

Various existing methods can be used to convert the pixel values within the to-be-processed image in the source color gamut into the coordinate values in the preset color space. For example, a color space a model may be established, and the pixel value data within the to-be-processed image is input into the color space conversion model to complete the conversion of the color space coordinate values, which is not limited herein.

Wherein, the default color space can be user-defined color space. Different electronic devices can set different color space, or can also set the same color space. Specifically, in the present embodiment, the preset color space may be CIELUV space, CIE 1964U*V*W* space, CIELAB space, CMYK space, HIS space, or LAB space, which is not limited herein.

The coordinate value is a plurality of coordinate values in the preset color space for representing the chromaticity of the image.

S103: determining whether a first color gamut point in the source color gamut is located outside a target color gamut according to the coordinate value.

Wherein. the first color gamut point is a pixel point.

In the present embodiment, the target color gamut may be a color gamut outputted by the display of the electronic device. In other embodiments, the target color gamut may also be a custom color gamut set according to the user's needs, which is not limited herein.

The source color gamut and the target color gamut have overlapping color gamuts that overlap with each other, and areas other than the target color gamut are the first color gamut points in the source color gamut that are outside the source color gamut in addition to the overlapped area. In the present embodiment, various existing methods and apparatuses may be used to determine whether the first color gamut point in the source color gamut is located outside the target color gamut, which is not limited herein.

In an embodiment, whether the first color gamut point is out of the target color gamut is determined by sequentially comparing the coordinate value of the first color gamut point with the coordinate value of the target gamut boundary. In other embodiments, it may also be determined in other manners, for example, whether the coordinate value of the first color gamut point is greater than the coordinate value of the outermost boundary point of the target color gamut.

S104: if yes, converting the first color gamut point into a second color gamut point in an outer converting region in the target color gamut.

Wherein, the second color gamut point is a pixel point.

The outer conversion color gamut in the target color gamut may be an area close to the target color gamut boundary in the target color gamut.

Specifically, in the present embodiment, when the first color gamut point is located outside the target color gamut, the first color gamut point is converted into a second color gamut point located in the target color gamut by the target color gamut boundary area.

Different from the prior art, the present disclosure provides an image processing method, which includes: inputting a to-be-processed image of a source color gamut; converting a pixel value within the to-be-processed image into a coordinate value of a preset color space; determining whether a first color gamut point in the source color gamut is located outside a target color gamut according to the coordinate value; if yes, converting the first color gamut point into a second color gamut point in an outer converting region in the target color gamut. By the above method, the present disclosure can transform the first color gamut point in the source color gamut outside the target color gamut into the second color gamut point in the outer converting region in the target color gamut, which avoids overlapping of multiple color gamut points in the source color gamut to the same color gamut of the target color gamut to avoid overlapping mapping, increasing the level of detail of the mapped image and improving the color of the image to obtain a high-definition image.

Wherein, in an embodiment, the preset color space is Lab space, and the coordinate value corresponding to Lab space is L*a*b* value.

Specifically, the b*, a*, and L* axes are used in the Lab space to define the color space. Where the L* value represents the lightness index, b* and a* represent the chromaticity index, where a* represents the red-green axis and b* represents the yellow-blue axis.

The following uses an application scenario as an example for the above embodiment:

The source color gamut is a sRGB color gamut After inputting the image in the sRGB color gamut, the color analyzer collects the RGB value of the pixel of the image. The corresponding gamma curve is selected according to the parameters of different electronic devices or the user's own needs, and the RGB value of the pixel is adjusted to the RGB optical value according to the selected gamma curve. The RGB optical values are the grayscale values of the red R sub-pixel, the green G sub-pixel, and the blue B sub-pixel.

Calculating the corresponding XYZ tristimulus values according to Formula 1 using the RGB optical values and the pre-stored TM matrix. Formula 1 is:

$$\begin{matrix} X \\ Y \\ Z \end{matrix} = TMs \times \begin{matrix} R \\ G \\ B \end{matrix}$$

The TM matrix is a conversion matrix between the RGB optical values (the red R sub-pixel, the green G sub-pixel and the blue B sub-pixel) and the XYZ tristimulus values. Here, X represents the red stimulus amount, Y represents the green stimulus amount, and Z represents the blue stimulus amount. Specifically, the TM matrix is a 3×3 matrix determined by the vertex coordinates of the sRGB color gamut triangle, and each matrix point element in the TM matrix is a constant previously set based on an empirical value or a calculated value. Specifically, in this embodiment, the TM matrix is:

$$TM = \begin{bmatrix} 0.412390799265959 & 0.0357584339383878 & 0.180480788401834 \\ 0.212639005871510 & 0.715168678767756 & 0.0721923153607337 \\ 0.0193308187155919 & 0.119194779794626 & 0.950532152249661 \end{bmatrix}$$

Calculating the L*a*b* value in the corresponding Lab space according to Formula 2 using the XYZ tristimulus value.

Formula 2 is:

$$L^* = 116 f\left(\frac{Y}{Y_n}\right) - 16$$

$$a^* = 500\left[f\left(\frac{X}{X_n}\right) - f\left(\frac{X}{X_n}\right)\right]$$

$$b^* = 200\left[f\left(\frac{Y}{Y_n}\right) - f\left(\frac{Z}{Z_n}\right)\right]$$

$$f(t) = \begin{cases} t^{\frac{1}{3}} & \text{if } t > \left(\frac{6}{29}\right)^3 \\ \frac{1}{3}\left(\frac{29}{6}\right)^2 t + \frac{4}{29} & \text{otherwise} \end{cases}$$

Here, Xn, Yn and Zn are constants set according to the maximum luminance value in the color gamut. Specifically, in the present embodiment, when the maximum luminance of the sRGB color gamut is normalized to 100, Xn is 95.047, Yn is 100, and Zn is 108.883.

Determining whether the first color gamut point in the source color gamut is located outside the target color gamut by the L*a*b* value of the first color gamut point. If the first color gamut point is located outside the target color gamut, the first color gamut point is transformed into a second color gamut point in the outer converting region in the target color gamut.

Figure 2:
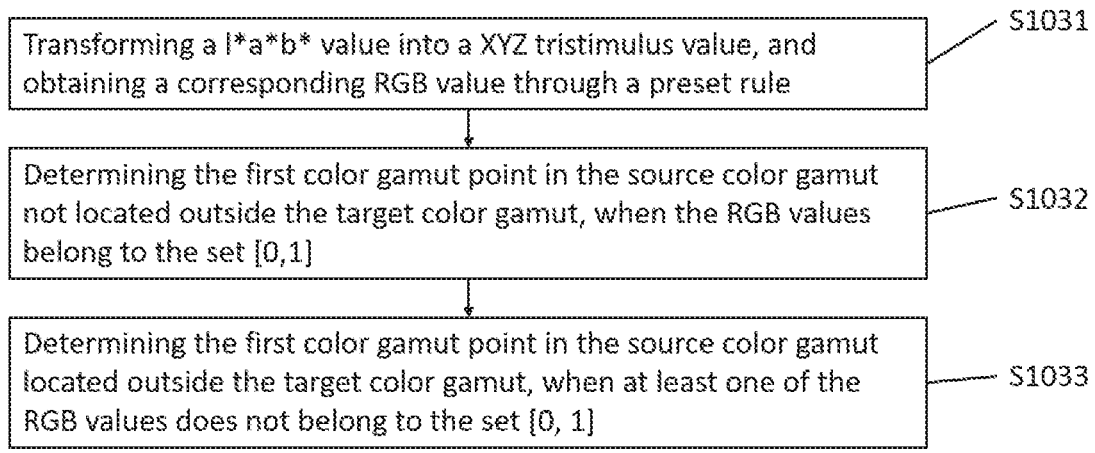
FIG. 2 is a schematic flow chart of step S103 of an embodiment of an image processing method according to the present disclosure.

Please referring to FIG. 2, FIG. 2 is a schematic flow chart of step S103 of an embodiment of an image processing method according to the present disclosure. In an embodiment, the step S103 includes:

sub-step S1031: transforming a L*a*b* value into a XYZ tristimulus value, and obtaining a corresponding RGB value through a preset rule.

Wherein, the corresponding XYZ tristimulus value is calculated according to Formula 3 using the L*a*b* value.

Formula 3 is:

$$f\left(\frac{Y}{Y_n}\right) = \frac{L + 16}{116}$$

$$f\left(\frac{X}{X_n}\right) = \frac{a}{500} + f\left(\frac{Y}{Y_n}\right)$$

$$f\left(\frac{Z}{Z_n}\right) = f\left(\frac{Y}{Y_n}\right) - b/200$$

$$t = \begin{cases} f(t)^{\wedge}3 & \text{iff}(t) > \frac{6}{29} \\ \left(f(t) - \frac{4}{29}\right)/\left(\frac{1}{3}\right)*(29/6)^{\wedge}2 & \text{otherwise} \end{cases}$$

Where a is the a* value of the first color gamut point in Lab space. $X_n$, $Y_n$, $Z_n$ are constants that are set according to the maximum luminance value in the color gamut. Specifically, in the present embodiment, when the maximum luminance of the sRGB color gamut is normalized to 100, $X_n$ is 95.047, $Y_n$ is 100, and $Z_n$ is 108.883.

Calculating the XYZ tristimulus value according to a preset rule corresponding to the RGB optical value.

The preset rule can be Formula 4. Formula 4 is:

$$\begin{matrix} R \\ G \\ B \end{matrix} = TMc^{-1} * \begin{matrix} X \\ Y \\ Z \end{matrix}$$

The TMc matrix is the conversion matrix between the XYZ tristimulus values and the RGB values. Specifically, the TMc matrix is a 3×3 matrix determined by the color gamut triangle shape outputted by the display of the electronic device. Since the color gamut triangles outputted by the electronic device are different from each other, the TMc matrix cannot be preset according to the empirical value or the calculated value.

sub-step S1032: determining the first color gamut point in the source color gamut not located outside the target color gamut, when the RGB values belong to the set [0,1].

Wherein, when the sub-step S1031 calculates that the grayscale value of the red R sub-pixel, the grayscale value of the green G sub-pixel, and the grayscale value of the blue B sub-pixel of the first color gamut point belong to the set [0,1], the first color gamut point in the source color gamut is not located outside the target gamut. Specifically, in the present embodiment, when the grayscale value of the red R sub-pixel, the grayscale value of the green G sub-pixel, and the grayscale value of the blue B sub-pixel are respectively 0, 0 and 0, the first color gamut point is not located outside the target color gamut. In other embodiments, when the grayscale value of the red R sub-pixel, the grayscale value of the green G sub-pixel, and the grayscale value of the blue B sub-pixel are respectively 1,1,1, the first color gamut point is not located outside the target color gamut. It should be noted that, here, the grayscale value of the red R sub-pixel, the grayscale value of the green G sub-pixel, and the grayscale value of the blue B sub-pixel are only examples and not limited thereto.

sub-step S1033: determining the first color gamut point in the source color gamut located outside the target color gamut, when at least one of the RGB values does not belong to the set [0, 1].

Wherein, when the sub-step S1031 calculates that at least one of the grayscale value of the red R sub-pixel, the grayscale value of the green G sub-pixel, and the grayscale value of the blue B sub-pixel of the first color gamut point does not belong to the set [0,1], the first color gamut point in the source color gamut is not located outside the target gamut.

Specifically, in the present embodiment, when the grayscale value of the red R sub-pixel, the grayscale value of the green G sub-pixel, and the grayscale value of the blue B sub-pixel are respectively 2,0,0, the first color gamut point is not located outside the target color gamut. In other embodiments, when the grayscale value of the red R sub-pixel, the grayscale value of the green G sub-pixel, and the grayscale value of the blue B sub-pixel are respectively 2,2,0, the first color gamut point is not located outside the target color gamut. It should be noted that, the grayscale value of the red R sub-pixel, the grayscale value of the green G sub-pixel, and the grayscale value of the blue B sub-pixel are only examples and not limited thereto.

According to the present embodiment, the L*a*b* value of the first color gamut point is converted into an RGB value, and then the position of the first color gamut point is determined. In this way, the operation of comparing the coordinate value of the first color gamut point with the coordinate value of the target gamut boundary can be omitted, the time for determining can be saved, and the position of the first color gamut point can be accurately determined.

Figure 3:
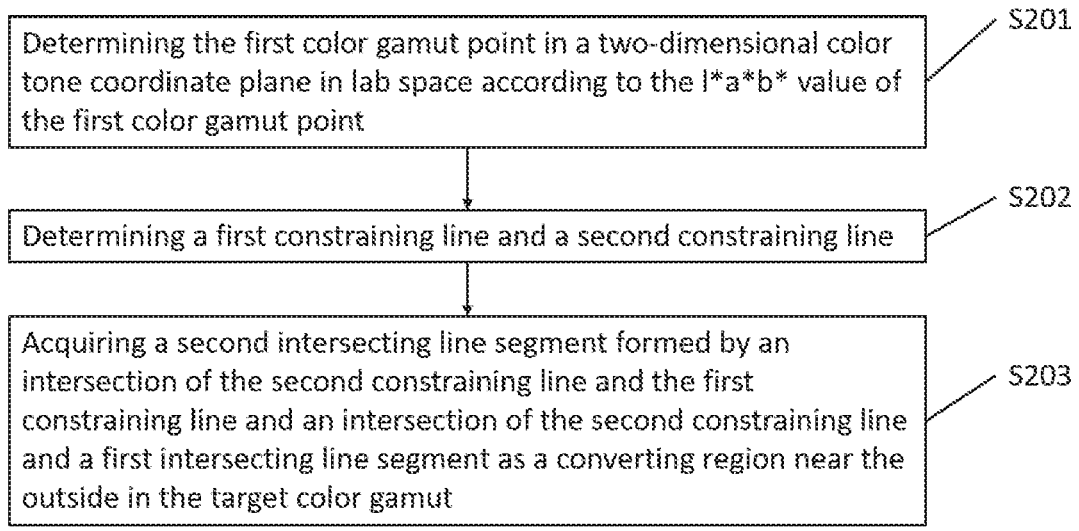
FIG. 3 is a flow chart of another embodiment of an image processing method according to the present disclosure.
Figure 4:
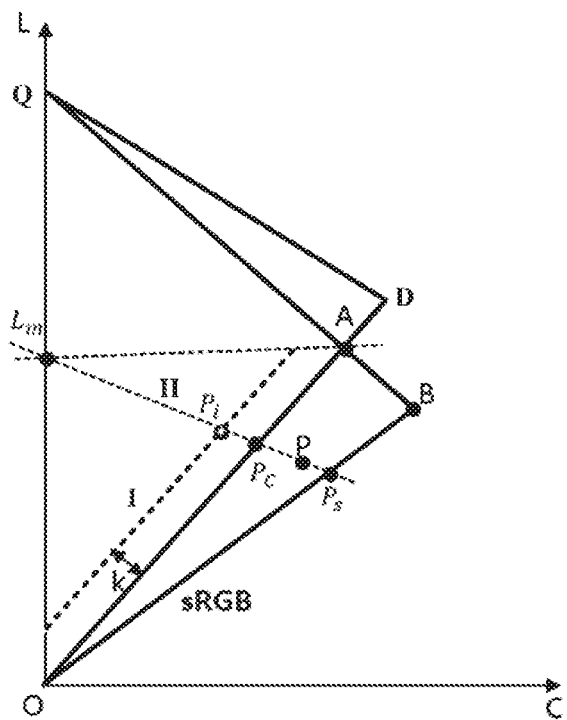
FIG. 4 is a schematic diagram of a mapping path according to an embodiment of an image processing method according to the present disclosure.

Please referring to FIG. 3 and FIG. 4, FIG. 3 is a flow chart of another embodiment of an image processing method according to the present disclosure, and FIG. 4 is a schematic diagram of a mapping path according to the embodiment of FIG. 3. In the present embodiment, the method includes the steps of:

step S201: determining the first color gamut point in a two-dimensional color tone coordinate plane in Lab space according to the L*a*b* value of the first color gamut point.

Wherein, the two-dimensional color tone coordinate plane in Lab space is a coordinate plane with color intensity L in LCH color space as ordinate and color saturation degree C. as abscissa. Specifically, the first color gamut point and the brightness axis are used as a plane in the Lab space, so that the three-dimensional space of the Lab space can be converted into a two-dimensional color coordinate plane. The L*a*b* value of the first color gamut point is calculated according to Formula 5, and the corresponding color brightness L, color saturation C and hue angle H are calculated. Formula 5 is:

$$H = \arctan\frac{b^*}{a^*}$$
$$C = \sqrt{a^{*2} + b^{*2}}$$
$$L = L^*$$

The position of the first color gamut point P is measured by the color brightness L and the color saturation C of the first color gamut point P on the two-dimensional color tone coordinate plane.

step S202: determining a first constraining line and a second constraining line.

Wherein, the first constraining line I and the second constraining line II may be line segments that constrain a second color gamut point (not labeled) to a certain area.

The first constraining line I and the sRGB color gamut (surface QOB) are parallel to the sub-color gamut (surface AOB) outside the target color gamut (surface QOD) and the first intersecting line OA of the target color gamut (surface QOD). Each of the first constraining line I and the first intersecting line segment OA may be a curve or a line segment, which is illustrated by a line segment in FIG. 4 for ease of understanding. The sRGB color gamut (surface QOB), sub color gamut (surface AOB), and target color gamut (surface QOD) may all be irregular surfaces, which are illustrated as triangles in FIG. 4 for ease of understanding.

The second constraining line II is jointly determined by the third color gamut point Lm and the first color gamut point P corresponding to the maximum luminance median value on the luminance axis L of the two-dimensional tone coordinate plane.

In the present embodiment, the maximum median brightness value may be the maximum median brightness value in the source color gamut. In other embodiments, the maximum median brightness value may also be the maximum median brightness value in the target color gamut. The median maximum brightness in the target gamut can be the median maximum brightness in the source color gamut.

Specifically, in the present embodiment, the third color gamut point Lm corresponding to the maximum brightness value of the source color gamut on the brightness axis L is known. The third color gamut point Lm and the first color gamut point P are connected to obtain a line segment PLm, and the line segment PLm is extended along the point P to obtain the second constraining line II.

step S203: acquiring a second intersecting line segment formed by an intersection of the second constraining line and the first constraining line and an intersection of the second constraining line and a first intersecting line segment as a converting region near the outside in the target color gamut.

The second constraining line II intersects the first constraining line I to form a point Pi, the second constraining line II intersects the first intersecting line OA to form a point Pc, the connection point Pi and the point Pc obtain a second intersecting line segment PiPc, the second intersecting line segment PiPc is close to the boundary OD of the target color gamut (face QOD). The second intersecting line segment PiPc serves as a converting region near the outside of the target color gamut (surface QOD).

With the present embodiment, the first constraining line and the second constraining line are established to determine the position of the converting region. The present embodiment is simple and easy to operate, and can accurately obtain the converting region within the boundary of the target area without duplication calculation, thereby further ensuring that the first color gamut point does not map to the boundary of the target area.

Figure 5:
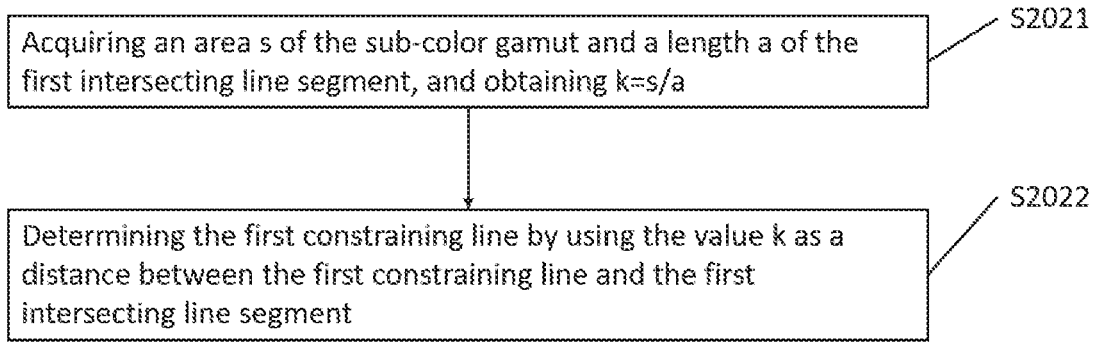
FIG. 5 is a schematic flow chart of step S202 of another embodiment of an image processing method according to the present disclosure.

Referring to FIG. 4 and FIG. 5, FIG. 5 is a schematic flow chart of step S202 of another embodiment of an image processing method according to the present disclosure. In the embodiment, the step S202 includes:

sub-pixel S2021: acquiring an area S of the sub-color gamut and a length a of the first intersecting line segment, and obtaining k=S/a.

Wherein, the area S of the sub-color gamut (surface AOB) and the length a of the first intersecting line segment OA can be obtained by various existing methods, which are not limited herein.

sub-step S2022: determining the first constraining line by using the value k as a distance between the first constraining line and the first intersecting line segment.

Specifically, k determined by sub-step S2021 is a distance, which is a parallel line at a distance k from the first intersecting line segment OA, and the parallel line is the first constraining line I.

According to the present embodiment, k is calculated to be half of the high length of the surface AOB, thereby ensuring that the position of the first constraining line does not overlap with the boundary of the target area.

Figure 6:
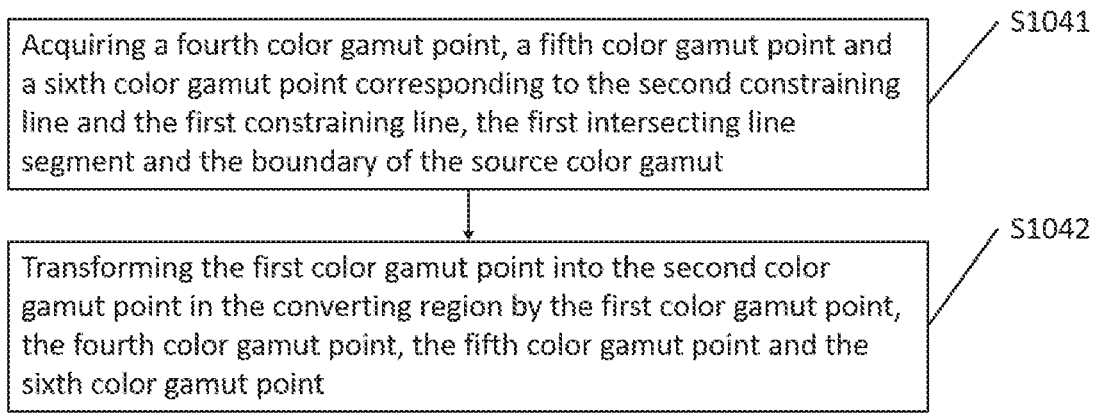
FIG. 6 is a schematic flow chart of step S104 in an embodiment of an image processing method according to the present disclosure.

Referring to FIG. 4 and FIG. 6, FIG. 6 is a schematic flow chart of step S104 in an embodiment of an image processing method according to the present disclosure. In the present embodiment, the step S104 includes:

sub-step S1041: acquiring a fourth color gamut point, a fifth color gamut point and a sixth color gamut point corresponding to the second constraining line and the first constraining line, the first intersecting line segment and the boundary of the source color gamut.

Specifically, the second constraining line II intersects with the first constraining line I to obtain a fourth color gamut point Pi, the second constraining line II intersects the first intersecting line segment OA to obtain a fifth color gamut point Pc, the second constraining line II intersects the boundary OB of the source color gamut to obtain a sixth color gamut point Ps.

sub-step S1042: transforming the first color gamut point into the second color gamut point in the converting region by the first color gamut point, the fourth color gamut point, the fifth color gamut point and the sixth color gamut point.

Specifically, the first color gamut point is mapped onto the second intersecting line segment by using the coordinate values of the first color gamut point, the fourth color gamut point, the fifth color gamut point and the sixth color gamut point to obtain a second color gamut point.

According to the present embodiment, the mapping range of the first color gamut point is further determined by using the positions of the multiple gamut points, so that the calculation steps are saved, and the first color gamut point can also be guaranteed not to be mapped on the boundary of the target region.

In the embodiment, the coordinate value $(C_1, L_1)$ of the first color gamut point P, the coordinate value $(C_4, L_4)$ of the fourth color gamut point Pi, the coordinate value $(C_5, L_5)$ of the fifth color gamut point Pc, the coordinate value $(C_6, L_6)$ of the sixth color gamut point Ps are obtained by the existing method. The coordinate value $(C_2, L_2)$ of the second color gamut point is calculated according to Formula 6. Formula 6 is:

$$L_2 = \frac{(L_5 - L_4)(L_1 - L_4)}{(L_6 - L_4)} + L_4$$

$$C_2 = \frac{(C_5 - C_4)(C_1 - C_4)}{(C_6 - C_4)} + C_4$$

$$C_1 = \sqrt{a_1^2 = b_1^2}$$

$$H_2 = H_1 = \arctan\frac{a_1}{b_1}$$

Where $a_1$ is the coordinate value a* of the first color gamut point in the Lab space, $b_1$ is the coordinate value b* of the first color gamut point in the Lab space, the second color gamut point hue angle $H_2$ is the same as the hue angle $H_1$ of the first color gamut point P.

The pixel value of the second color gamut point in the target color gamut (surface QOD) is obtained according to the coordinate $(C_2, L_2)$ of the second color gamut point and the corresponding hue angle $H_2$. The pixel value in the target color gamut (surface QOD) may be the grayscale value of each color sub-pixel corresponding to the second color gamut point. Specifically, in the present embodiment, the pixel value is the grayscale value of the red R sub-pixel, the green G sub-pixel, and the blue B sub-pixel corresponding to the second color gamut point.

Specifically, in the present embodiment, the L*a*b* values of the second color gamut point are calculated according to Formula 7 using the coordinate $(C_2, L_2)$ of the second color gamut point and the corresponding hue angle $H_2$.

Formula 7 is:

$$C_2 = \sqrt{a_2^2 + b_2^2}$$

$$H_2 = \arctan\frac{a_2}{b_2}$$

$a_2$ is the coordinate value of the second color gamut point in Lab space a*, $b_2$ is the coordinate value of the second color gamut point in Lab space b*, $L_2$ is the coordinate value of the second color gamut point in Lab space L*.

The XYZ tristimulus value of the second color gamut point is calculated according to Formula 8 using the L*a*b* value of the second color gamut point. Formula 8 is:

$$f\left(\frac{Y}{Y_n}\right) = \frac{L+16}{116}$$

$$f\left(\frac{X}{X_n}\right) = \frac{a}{500} + f\left(\frac{Y}{Y_n}\right)$$

-continued $$f\left(\frac{Z}{Z_n}\right) = f\left(\frac{Y}{Y_n}\right) - b/200$$

$$t = \begin{cases} f(t)^\wedge 3 & \text{if } f(t) > \frac{6}{29} \\ \left(f(t) - \frac{4}{29}\right) / \left(\left(\frac{1}{3}\right) * (29/6)^\wedge 2\right) & \text{otherwise} \end{cases}$$

Where a is the a* value of the second color gamut point in Lab space and b is the coordinate value b* of the second color gamut point in Lab space. $X_n$, $Y_n$, and $Z_n$ are constants set according to the maximum luminance value in the color gamut, which is not limited herein.

The XYZ tristimulus value is used to calculate the RGB optical value of the second color gamut point according to Formula 9.

Formula 9 is:

$$\begin{matrix} R \\ G \\ B \end{matrix} = TM^{-1} * \begin{matrix} X \\ Y \\ Z \end{matrix}$$

The inverse of the TM matrix is the conversion matrix between the RGB optical values and the XYZ tristimulus values. Specifically, TM inverse matrix is a 3×3 matrix determined by the shape of the gamut triangle output by the display of the electronic device. Due to different electronic devices, the output of the TM inverse matrix cannot be set in advance according to the empirical value or the calculated value.

The RGB optical value is selected according to the parameters of different electronic devices or the user's own needs, and the corresponding gamma curve is adjusted to be the pixel value in the target color gamut. Specifically, in the present embodiment, the pixel values may be the grayscale values of the red R sub-pixel, the green G sub-pixel and the blue B sub-pixel corresponding to the second color gamut point in the target color gamut.

Figure 7:
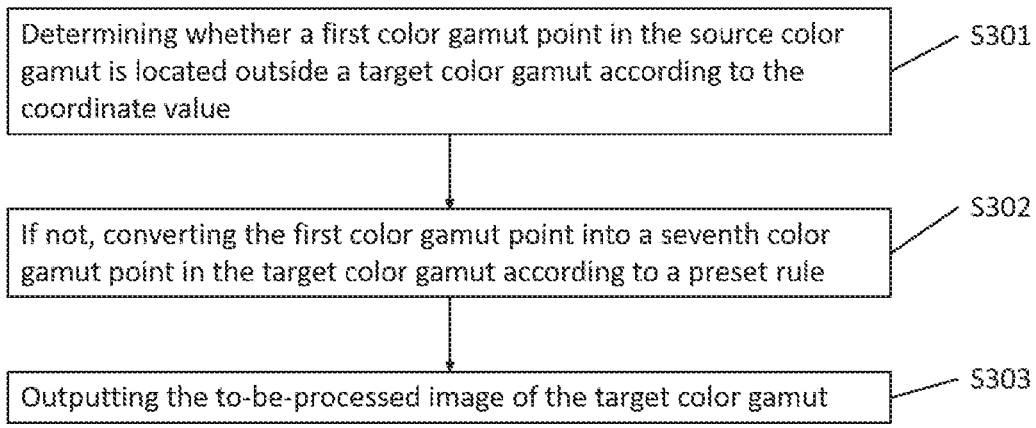
FIG. 7 is a schematic flow chart of the other embodiment of an image processing method according to the present disclosure.

Referring to FIG. 7, FIG. 7 is a schematic flow chart of the other embodiment of an image processing method according to the present disclosure. In the present embodiment, the method includes the steps of:

S301: determining whether a first color gamut point in the source color gamut is located outside a target color gamut according to the coordinate value.

For details, reference may be made to step S103, which is not described herein again.

S302: if not, converting the first color gamut point into a seventh color gamut point in the target color gamut according to a preset rule.

Specifically, in the present embodiment, the RGB optical value of the seventh color gamut point is calculated according to Formula 10 using the first color gamut point XYZ tristimulus value.

Formula 10 is:

$$\begin{matrix} R \\ G \\ B \end{matrix} = TM^{-1} * \begin{matrix} X \\ Y \\ Z \end{matrix}$$

The inverse of the TM matrix is the conversion matrix between the RGB optical values and the XYZ tristimulus values. Specifically, TM inverse matrix is a 3×3 matrix determined by the shape of the gamut triangle output by the display of the electronic device. Due to different electronic devices, the output of the TM inverse matrix cannot be set in advance according to the empirical value or the calculated value.

The RGB optical value is selected according to the parameters of different electronic devices or the user's own needs, and the corresponding gamma curve is adjusted to be the pixel value in the target color gamut. Specifically, in the present embodiment, the pixel value may be the grayscale value of the red R sub-pixel, the green G sub-pixel, and the blue B sub-pixel corresponding to the seventh color gamut point.

S303: outputting the to-be-processed image of the target color gamut.

According to the present embodiment, the first color gamut point outside the target area is mapped into the target area, the calculation steps are saved, and the color image according to the user's requirement can be output.

Figure 8:
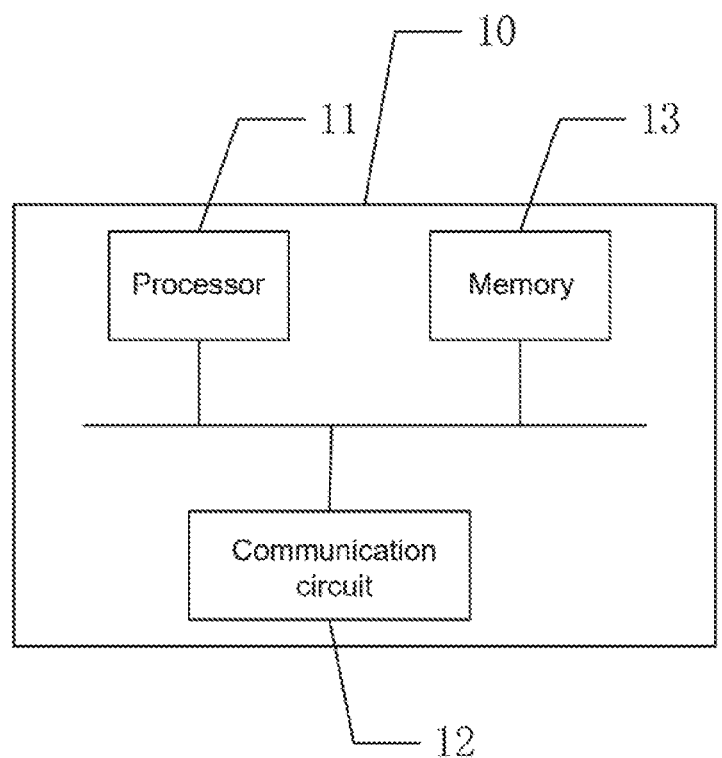
FIG. 8 is a schematic structural diagram of an electronic device according to an embodiment of the present disclosure.

Referring to FIG. 8, FIG. 8 is a schematic structural diagram of an electronic device according to an embodiment of the present disclosure. The electronic device may be an electronic device that has an image display function and can be used by a user to edit an image through the electronic device. The electronic device may be a television, a cell phone, a notebook, a tablet, an MP4, or the like. The electronic device 10 includes a processor 11, a communication circuit 12, and a memory 13. The communication circuit 12 may be a display screen. The processor 11 is coupled to the communication circuit 12 and the memory 13. The processor 11, the communication circuit 12, and the memory 13 can jointly execute the steps in the foregoing image processing method according to the embodiments of the present disclosure. The details are as follows:

the communication circuit 12 is used for inputting a to-be-processed image of a source color gamut;

the memory 13 is configured to store to-be-processed images inputted to the source color gamut;

the processor 11 is configured to convert pixel values in the to-be-processed image into coordinate values in a preset color space;

the processor 11 is configured to determine whether the first color gamut point in the source color gamut is located outside the target color gamut by using the coordinate values; if yes, converting the first color gamut point into a second color gamut point in the outer converting region in the target color gamut;

the communication circuit 12 is configured to output the to-be-processed image of the target color gamut.

The preset color space is Lab space, and the coordinate value is L*a*b* value.

In the embodiment, after confirming that the first color gamut point in the source color gamut is outside the target color gamut, the processor 11 converts the L*a*b* value into an XYZ tristimulus value and obtains a corresponding RGB value by using a preset rule. When the RGB values belong to the set [0, 1], it is determined that the first color gamut point in the source color gamut is not located outside the target color gamut. When at least one of the RGB values does not belong to the set [0, 1], it is determined that the first color gamut point in the source color gamut is located outside the target color gamut.

In an embodiment, the processor 11 is configured to determine a two-dimensional color tone coordinate plane of the first color gamut point in the Lab space according to the L*a*b* value of the first color gamut point. Specifically, the processor 11 determines the first constraining line and the second constraining line. Wherein the first constraining line is parallel to a sub-color gamut where the source color gamut is located outside the target color gamut and the first intersecting line segment of the target color gamut, and the second constraining line is determined by a third color gamut point corresponding to a median value of a maximum luminance on a luminance axis of the two-dimensional tone coordinate plane and the first color gamut point;

the processor 11 is further used to acquire a second intersecting line segment formed by an intersection of the second constraining line and the first constraining line and an intersection of the second constraining line and a first intersecting line segment as a converting region near the outside in the target color gamut.

In the embodiment, the processor 11 is configured to obtain the area S of the sub-color gamut and the length a of the first intersecting line segment and obtain k=S/a;

the processor 11 determines the first constraining line with the value of k as the distance between the first constraining line and the first intersecting line segment.

In the embodiment, the processor 11 obtains the corresponding fourth color gamut point, the fifth color gamut point, and the sixth color gamut point through the second constraining line and the first constraining line, the first intersecting line segment and the boundary of the source color gamut;

the processor 11 transforms the first color gamut point into a second color gamut point in the converting region by using the first color gamut point, the fourth color gamut point, the fifth color gamut point, and the sixth color gamut point.

In the embodiment, the processor 11 is further configured to obtain coordinate values of the first color gamut point, the fourth color gamut point, the fifth color gamut point and the sixth color gamut point on the two-dimensional color tone coordinate plane, which are $(C_1, L_1)$, $(C_4, L_4)$, $(C_5, L_5)$, $(C_6, L_6)$ and derive the coordinate $(C_2, L_2)$ of the second color gamut point;

wherein, $$L_2 = \frac{(L_5 - L_4)(L_1 - L_4)}{(L_6 - L_4)} + L_4,$$

$$C_2 = \frac{(C_5 - C_4)(C_1 - C_4)}{(C_6 - C_4)} + C_4,$$

$$C_1 = \sqrt{a_1^2 + b_1^2},$$

the hue angles of the second color gamut point and the first color gamut point are the same:

$$H_2 = H_1 = \arctan\frac{a_1}{b_1};$$

the processor 11 obtains the pixel value of the second color gamut point in the target color gamut according to the coordinate $(C_2, L_2)$ of the second color gamut point and the corresponding hue angle $H_2$.

In the embodiment, if it is determined that the first color gamut point in the source color gamut is not located outside the target color gamut, the processor 11 converts the first color gamut point into a seventh color gamut point in the target color gamut according to a preset rule in the memory 13;

the communication circuit 12 is configured to output a to-be-processed image of a target color gamut.

The memory 13 is configured to store the to-be-processed images inputted to the source color gamut.

Figure 9:
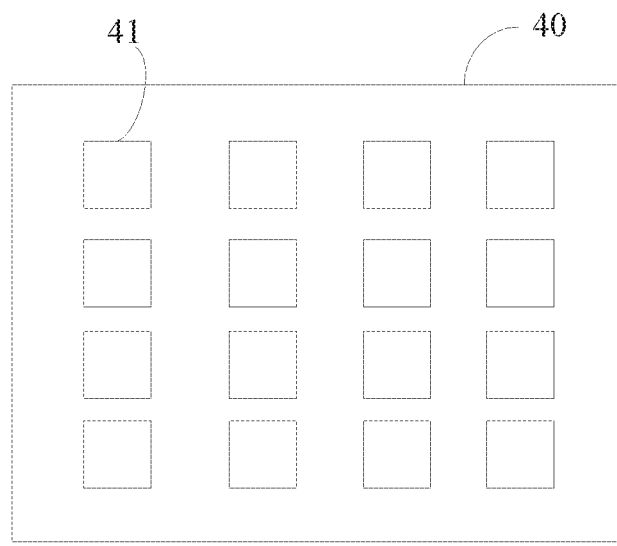
FIG. 9 is a schematic structural diagram of an embodiment of an apparatus having a storage function according to the present disclosure.

Referring to FIG. 9, FIG. 9 is a schematic structural diagram of an embodiment of an apparatus having a storage function according to the present disclosure. In the present embodiment, the apparatus 40 having the memory function stores program data 41 that can be executed to implement the steps in the foregoing image processing method embodiment of the present disclosure. For a detailed description of the related content, reference may be made to the foregoing method, and details are not described herein again.

The apparatus 40 having the storage function may be at least one of a server, a floppy disk drive, a hard disk drive, a CD-ROM reader, a magneto-optical disk reader, a CPU (for RAM).

The foregoing descriptions are merely embodiments of the present disclosure, and do not limit the scope of the present disclosure. All equivalent structures or equivalent changes made using the contents of the specification and drawings of the present disclosure or directly or indirectly applied to other related technical fields are also covered in the patent protection scope of the present disclosure.

What is claimed is:

1. An electronic device, comprising:
a processor, a communication circuit and a memory, wherein the processor is coupled to the communication circuit and the memory;
the communication circuit is used for inputting a to-be-processed image of a source color gamut;
the processor is configured to convert a pixel value within the to-be-processed image into a coordinate value of a preset color space, and to determine whether a first color gamut point in the source color gamut is located outside a target color gamut according to the coordinate value, if yes, converting the first color gamut point into a second color gamut point in an outer converting region in the target color gamut; if not, converting the first color gamut point into a seventh color gamut point in the target color gamut according to a preset rule, and outputting the to-be-processed image of the target color gamut;
wherein the preset color space is a Lab space, and the coordinate value is a L*a*b* value;
wherein the processor is further configured to determine a two-dimensional color tone coordinate plane of the first color gamut point in the Lab space, a first constraining line and a second constraining line, according to an L*a*b* value of the first color gamut point, and to acquire a second intersecting line segment formed by an intersection of the second constraining line and the first constraining line and an intersection of the second constraining line and a first intersecting line segment as a converting region near the outside in the target color gamut;
wherein the first constraining line is parallel to a sub-color gamut where the source color gamut is located outside the target color gamut and the first intersecting line segment of the target color gamut, and the second constraining line is determined by a third color gamut point corresponding to a median value of a maximum luminance on a luminance axis of the two-dimensional tone coordinate plane and the first color gamut point;

wherein the processor is further to acquire a fourth color gamut point, a fifth color gamut point and a sixth color gamut point corresponding to the second constraining line and the first constraining line, the first intersecting line segment and the boundary of the source color gamut, and to transform the first color gamut point into the second color gamut point in the converting region by the first color gamut point, the fourth color gamut point, the fifth color gamut point and the sixth color gamut point;

wherein the processor is further configured to acquire coordinate values of the first color gamut point, the fourth color gamut point, the fifth color gamut point and the sixth color gamut point on the two-dimensional color tone coordinate plane, respectively as $(C_1, L_1)$, $(C_4, L_4)$, $(C_5, L_5)$ and $(C_6, L_6)$, to derive the coordinate value $(C_2, L_2)$ of the second color gamut point, and to obtain the pixel value of the second color gamut point in the target color gamut according to the coordinate $(C_2, L_2)$ of the second color gamut point and the corresponding hue angle $H_2$;

wherein, $$L_2 = \frac{(L_5 - L_4)(L_1 - L_4)}{(L_6 - L_4)} + L_4,$$

$$C_2 = \frac{(C_5 - C_4)(C_1 - C_4)}{(C_6 - C_4)} + C_4,$$

$$C_1 = \sqrt{a_1^2 + b_1^2},$$

where $a_1$ is the coordinate value a* of the first color gamut point in the Lab space, $b_1$ is the coordinate value of b* the first color gamut point in the Lab space, the hue angles of the second color gamut point and the first color gamut point are the same:

$$H_2 = H_1 = \arctan\frac{a_1}{b_1}.$$

2. The electronic device according to claim 1, wherein the processor is configured to convert the L*a*b* value into an XYZ tristimulus value, and to obtain a corresponding RGB value according to a preset rule, when the RGB values belong to a set [0,1], it is determined that the first color gamut point in the source color gamut is not located outside the target color gamut, and when at least one of the RGB values does not belong to the set [0, 1], it is determined that the first color gamut point in the source color gamut is located outside the target color gamut.

3. The electronic device according to claim 1, wherein the processor is further configured to acquire an area S of the sub-color gamut and a length a of the first intersecting line segment to obtain k=S/a, and to determine the first constraining line by using the value k as a distance between the first constraining line and the first intersecting line segment.

4. An image processing method, comprising:
inputting a to-be-processed image of a source color gamut;
converting a pixel value within the to-be-processed image into a coordinate value of a preset color space, wherein the preset color space is a Lab space, and the coordinate value is a L*a*b* value;
determining whether a first color gamut point in the source color gamut is located outside a target color gamut according to the coordinate value;
if yes, converting the first color gamut point into a second color gamut point in an outer converting region in the target color gamut;
determining a two-dimensional color tone coordinate plane of the first color gamut point in the Lab space according to an L*a*b* value of the first color gamut point;
determining a first constraining line and a second constraining line, wherein the first constraining line is parallel to a sub-color gamut where the source color gamut is located outside the target color gamut and the first intersecting line segment of the target color gamut, and the second constraining line is determined by a third color gamut point corresponding to a median value of a maximum luminance on a luminance axis of the two-dimensional tone coordinate plane and the first color gamut point;
acquiring a second intersecting line segment formed by an intersection of the second constraining line and the first constraining line and an intersection of the second constraining line and a first intersecting line segment as a converting region near the outside in the target color gamut;
acquiring a fourth color gamut point, a fifth color gamut point and a sixth color gamut point corresponding to the second constraining line and the first constraining line, the first intersecting line segment and the boundary of the source color gamut;
transforming the first color gamut point into the second color gamut point in the converting region by the first color gamut point, the fourth color gamut point, the fifth color gamut point and the sixth color gamut point;
acquiring coordinate values of the first color gamut point, the fourth color gamut point, the fifth color gamut point and the sixth color gamut point on the two-dimensional color tone coordinate plane, respectively as $(C_1, L_1)$, $(C_4, L_4)$, $(C_5, L_5)$ and $(C_6, L_6)$, deriving the coordinate value $(C_2, L_2)$ of the second color gamut point;
wherein, $$L_2 = \frac{(L_5 - L_4)(L_1 - L_4)}{(L_6 - L_4)} + L_4,$$

$$C_2 = \frac{(C_5 - C_4)(C_1 - C_4)}{(C_6 - C_4)} + C_4,$$

$$C_1 = \sqrt{a_1^2 + b_1^2},$$

where $a_1$ is the coordinate value a* of the first color gamut point in the Lab space, $b_1$ is the coordinate value b* of the first color gamut point in the Lab space, the hue angles of the second color gamut point and the first color gamut point are the same:

$$H_2 = H_1 = \arctan\frac{a_1}{b_1};$$

and obtaining the pixel value of the second color gamut point in the target color gamut according to the coordinate $(C_2, L_2)$ of the second color gamut point and the corresponding hue angle $H_2$.

5. The method according to claim 4, wherein the step of determining whether a first color gamut point in the source color gamut is located outside a target color gamut according to the L*a*b* value comprises:
 converting the L*a*b* value into an XYZ tristimulus value, and obtaining a corresponding RGB value through a preset rule;
 determining the first color gamut point in the source color gamut not located outside the target color gamut, when the RGB values belong to a set [0,1], and
 determining the first color gamut point in the source color gamut located outside the target color gamut, when at least one of the RGB values does not belong to the set [0,1].

6. The method according to claim 4, wherein the step of determining a first constraining line comprises:
 acquiring an area S of the sub-color gamut and a length a of the first intersecting line segment, and obtaining k=S/a; and
 determining the first constraining line by using the value k as a distance between the first constraining line and the first intersecting line segment.

7. The method according to claim 4, wherein the method further comprises:
 if not, converting the first color gamut point into a seventh color gamut point in the target color gamut according to a preset rule; and
 outputting the to-be-processed image of the target color gamut.

8. An apparatus having a non-transitory computer readable medium, wherein the apparatus having a non-transitory computer readable medium stores program data to perform a method, and when the program data is executed by a processor, the method comprises the following steps:
 inputting a to-be-processed image of a source color gamut;
 converting a pixel value within the to-be-processed image into a coordinate value of a preset color space, wherein the preset color space is a Lab space, and the coordinate value is a L*a*b* value;
 determining whether a first color gamut point in the source color gamut is located outside a target color gamut according to the coordinate value;
 if yes, converting the first color gamut point into a second color gamut point in an outer converting region in the target color gamut;
 determining a two-dimensional color tone coordinate plane of the first color gamut point in the Lab space according to an L*a*b* value of the first color gamut point;
 determining a first constraining line and a second constraining line, wherein the first constraining line is parallel to a sub-color gamut where the source color gamut is located outside the target color gamut and the first intersecting line segment of the target color gamut, and the second constraining line is determined by a third color gamut point corresponding to a median value of a maximum luminance on a luminance axis of the two-dimensional tone coordinate plane and the first color gamut point;
 acquiring a second intersecting line segment formed by an intersection of the second constraining line and the first constraining line and an intersection of the second constraining line and a first intersecting line segment as a converting region near the outside in the target color gamut;
 acquiring a fourth color gamut point, a fifth color gamut point and a sixth color gamut point corresponding to the second constraining line and the first constraining line, the first intersecting line segment and the boundary of the source color gamut;
 transforming the first color gamut point into the second color gamut point in the converting region by the first color gamut point, the fourth color gamut point, the fifth color gamut point and the sixth color gamut point;
 acquiring coordinate values of the first color gamut point, the fourth color gamut point, the fifth color gamut point and the sixth color gamut point on the two-dimensional color tone coordinate plane, respectively as $(C_1, L_1)$, $(C_4, L_4)$, $(C_5, L_5)$ and $(C_6, L_6)$, deriving the coordinate value $(C_2, L_2)$ of the second color gamut point;
 wherein, $$L_2 = \frac{(L_5 - L_4)(L_1 - L_4)}{(L_6 - L_4)} + L_4,$$

$$C_2 = \frac{(C_5 - C_4)(C_1 - C_4)}{(C_6 - C_4)} + C_4,$$

$$C_1 = \sqrt{a_1^2 + b_1^2},$$

where $a_1$ is the coordinate value a* of the first color gamut point in the Lab space, $b_1$ is the coordinate value b* of the first color gamut point in the Lab space, the hue angles of the second color gamut point and the first color gamut point are the same:

$$H_2 = H_1 = \arctan\frac{a_1}{b_1};$$

and obtaining the pixel value of the second color gamut point in the target color gamut according to the coordinate $(C_2, L_2)$ of the second color gamut point and the corresponding hue angle $H_2$.

9. The apparatus according to claim 8, when the program data is executed by the processor, the following steps are implemented:
 converting the L*a*b* value into an XYZ tristimulus value, and obtaining a corresponding RGB value through a preset rule;
 determining the first color gamut point in the source color gamut not located outside the target color gamut, when the RGB values belong to a set [0,1], and
 determining the first color gamut point in the source color gamut located outside the target color gamut, when at least one of the RGB values does not belong to the set [0,1].

10. The apparatus according to claim 8, when the program data is executed by the processor, the following steps are implemented: acquiring an area S of the sub-color gamut and a length a of the first intersecting line segment, and obtaining k=S/a; and
 determining the first constraining line by using the value k as a distance between the first constraining line and the first intersecting line segment.

* * * * *